Nov. 7, 1933.    A. I. MARCUM    1,933,674
STEERING MECHANISM FOR MULTIWHEEL ROAD VEHICLES
Original Filed Feb. 23, 1929    3 Sheets-Sheet 1
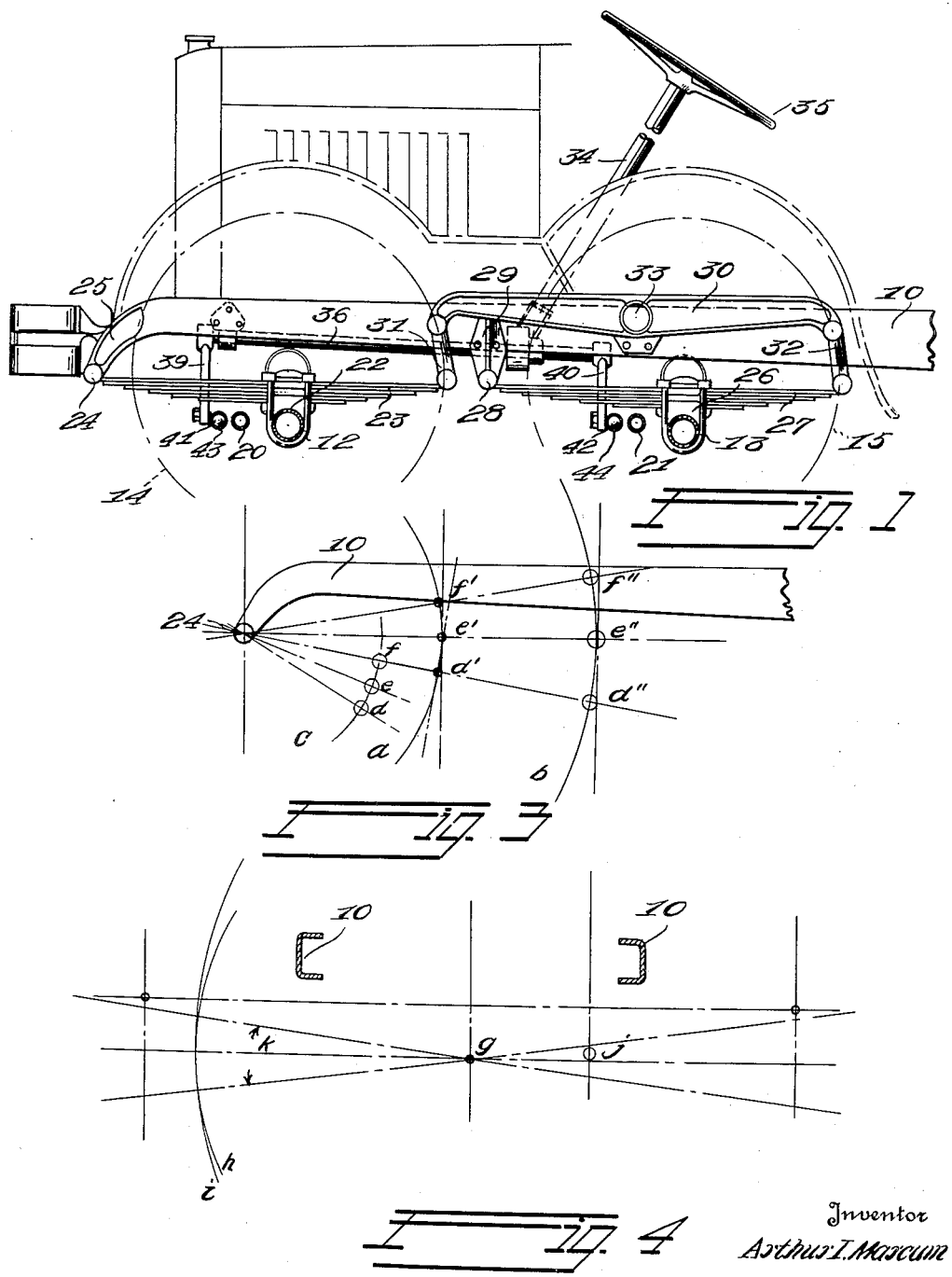

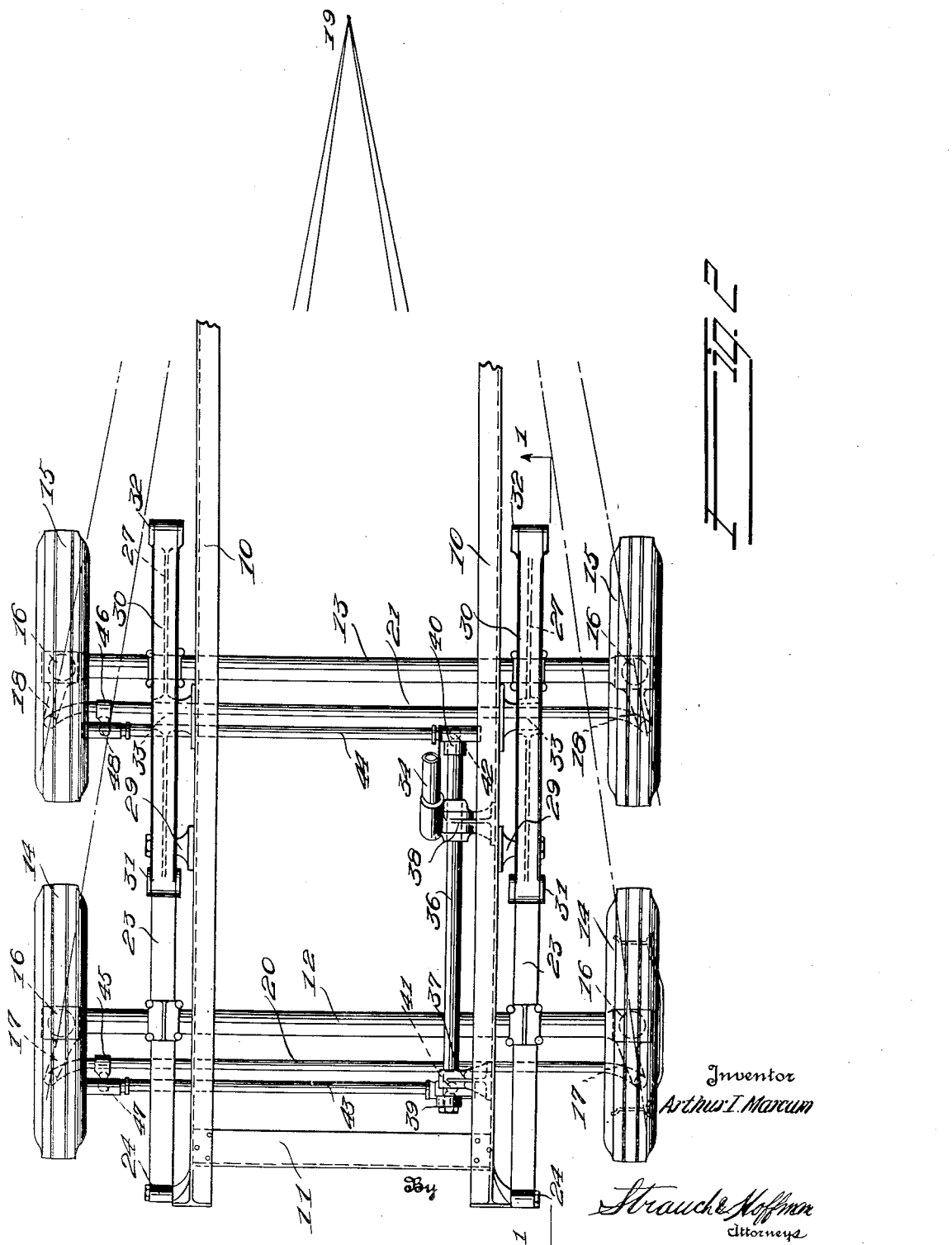

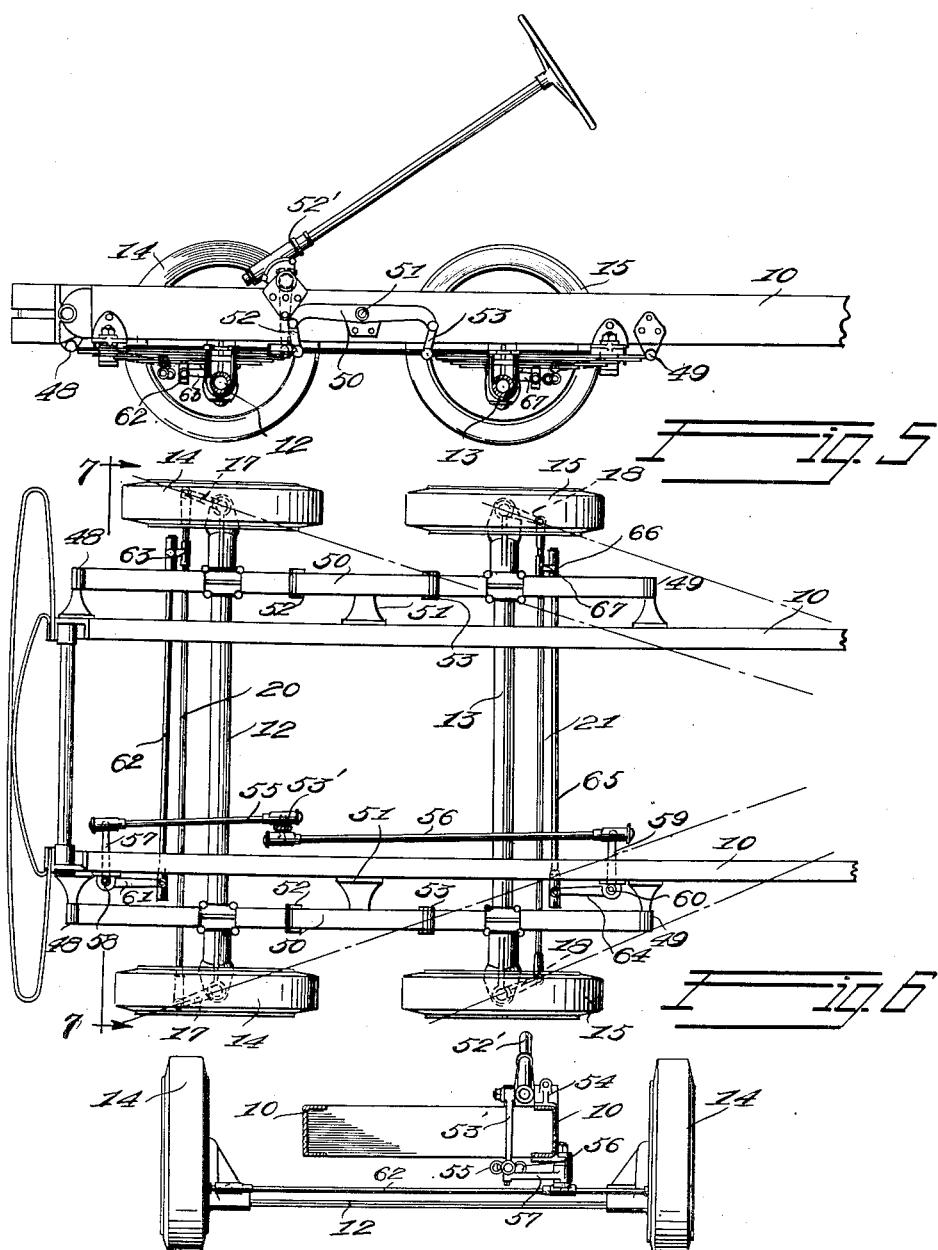

Patented Nov. 7, 1933

1,933,674

UNITED STATES PATENT OFFICE 1,933,674

STEERING MECHANISM FOR MULTIWHEEL ROAD VEHICLES

Arthur I. Marcum, Oakland, Calif., assignor, by mesne assignments, to Automotive Engineering Corporation, a corporation of Delaware Application February 23, 1929, Serial No. 342,116
Renewed March 25, 1933

6 Claims. (Cl. 280—91)

This invention relates to a stering mechanism for multi-wheel road vehicles, particularly of the type that includes a pair of axles disposed forwardly of the frame in relatively close proximity to each other, such as disclosed in my application Serial No. 658,179, filed August 18, 1923, of which application this is a continuation in part. When a vehicle is provided with a pair of axles arranged relatively closely together so that the peripheries of the wheels that support the axles are normally near together, it is essential that great flexibility of movement between the wheels be permitted in order that each wheel be free to follow irregularities in the road over which the vehicle is moving. This requires that each of the axles be mounted so that it can move substantially relative to the other axle as the wheels that support it follow the depressions and elevations in the road. The necessary degree of flexibility has heretofore been sought to be secured by connecting the axles together in the form of a truck and by pivoting these trucks on an axis extending transversely of the frame substantially midway between the axles, so that the several axles would move with respect to a common pivot.

In my copending application, Serial No. 32,357, filed May 23, 1925, I have disclosed an improved spring suspension for connecting a pair of axles each supported on wheels that are normally relatively close together in such a way that greater flexibility of the several axles is secured. In multi-wheel road vehicles, such as described in said application, having the necessary degree of flexibility it is a matter of importance to correlate the spring suspension and the steering mechanism in such a manner that when the axles move in the manner permitted by their spring suspensions no substantial stresses are introduced in the steering mechanism, that make steering difficult and that cause the wheels to wobble in service. Destructive strains and stresses have heretofore been produced in the steering mechanism due to the fact that no proper provision was made to freely allow the movement of the axles permitted by their spring suspensions, but such movement caused severe shocks to the steering mechanism due to the fact that the links that connect the frame-carried steering mechanism to the wheel-carried steering mechanism were not so arranged and correlated to the spring suspension that said links were free to move in a path that is substantially parallel to the normal path of movement of the axles.

This invention aims to overcome the objections just referred to, by providing a steering mechanism that is properly arranged and correlated to the spring suspension, so as to avoid the destruction of the steering mechanism and the introduction of difficulties in steering the vehicle, while at the same time introducing no factors that restrict the movements of the axles.

The primary object of the invention is to accordingly provide a steering arrangement for an extremely flexible vehicle so designed that the free movement of the axles with respect to the frame is not prevented by the steering mechanism and so that the movement of the axles permitted by the springs, that connect them to the frame, will not introduce stresses into the steering linkages of a substantial kind.

A still further object of the invention is to provide a steering mechanism for a flexible road vehicle in which the frame connected steering mechanism and the wheel carried steering mechanism are interconnected by links that extend transversely of the frame, so that long links may be used and so that the point of connection between the end of the links and the axle may readily move in parallel arcs approximating a straight line.

A still further object of the invention is to provide a steering mechanism in which the frame carried steering mechanism and the wheel carried steering mechanism are connected by a link that swings in a plane that is transverse to the vehicle, and in which, the point of connection between said link and the center of the axle are normally disposed in the same horizontal plane so that said point and the adjacent portion of the axle move on arcs that are tangent normally.

Further objects of the invention will appear as a description thereof proceeds with reference to the accompanying drawings in which:

Figure 1 is a longitudinal sectional view taken on the plane indicated by the line 1—1 in Figure 2, looking in the direction of the arrows.

Figure 2 is a plan view of the forward end of a multi-wheel road vehicle embodying the invention.

Figure 3 is a view showing diagrammatically the position of the axle in a plurality of its possible positions and its path of movement, and the position of the steering connection at each of said positions of the axle and its path of movement.

Figure 4 is another diagrammatic view showing the movement of the end of a steering link and of an axle under conditons of service.

Figure 5 is a view similar to Figure 1 but showing a modification.

Figure 6 is a plan view of the construction shown in Figure 5.

Figure 7 is a transverse sectional view taken on the plane indicated by the line 7—7 looking in the direction of the arrows, on Figure 6.

Like reference characters indicate like parts throughout the several figures.

Referring to the drawings, the numeral 10 indicates the longitudinal members of the chassis of the vehicle, while 11 indicates a transverse member. The invention about to be described is intended particularly for use in connection with the steering of the two pairs of wheels of a multi-wheel road vehicle embodying a pair of axles arranged adjacent each end of the chassis frame to support said frame. On the drawings, axles 12 and 13 are disposed adjacent the forward end of the chassis frame 10. A pair of wheels 14 support the axle 12 and a similar pair of wheels 15 support the axle 13. The wheels 14 and 15 on the same side of the vehicle frame are preferably disposed so that their peripheries are relatively close together. The axles 12 and 13 are, preferably, tubular in form and their bodies are offset with respect to the center of the wheels 14 and 15 respectively in order to provide a construction having a low center of gravity. The end portions of the axles 12 and 13 are upwardly offset and provided with king pins 16 of well known construction. The wheels 14 and 15 are mounted so that they may turn about the axes of said king pins during the steering of the vehicle. In order to effect the steering of the wheels, the wheels 14 are provided with steering arms 17 and the wheels 15 are provided with steering arms 18. It will be observed, referring to Figure 2, that the arms 17 and 18 radiate from a point 19, this point being the center of the rear truck that is utilized to support the opposite end of the chassis frame 10. That is the arms 17 and 18 are not parallel but are disposed at a slight angle to each other. This arrangement is provided in order to cause the wheels to shift properly upon actuation of the steering mechanism.

It will be observed that the king pins 16 are disposed so that their centers are located in the substantially vertical plane that bisects the tread of the wheels. This arrangement permits the steering of the wheels without the application of a great amount of power because of the balanced construction present. This is a matter of importance in a multi-wheel vehicle, in which it is necessary to steer four wheels rather than two, with a steering mechanism of the type that has heretofore been utilized only to steer a pair of dirigible wheels. The arms 17 carried by the wheels 14 on axle 12 are connected together by a link 20, while the arms 18 carried by the wheels 15 on axle 13 are connected together by a link 21 so that said pairs of wheels are caused to move simultaneously.

In order that each wheel shall be free to follow irregularities in the road it is necessary that the axles be mounted in such manner that they are free to readily partake of relative motion with respect to each other and with respect to the frame. In order to do this a spring suspension having a high degree of flexibility is provided.

Identical spring suspensions are provided at both sides of the chassis frame and only one of these suspensions will be here described. The axle 12 is provided adjacent each end with a fixed spring seat 22 on which seat is disposed the central portion of a spring 23 rigidly secured thereto between its ends in any suitable manner. One end of the spring is pivoted at 24 to a downwardly projecting arm 25 of the longitudinal member 10. Similarly the axle 13 is provided with a spring seat 26 upon which rests the mid-portion of a spring 27 that is suitably clamped upon said seat in any well known manner. The forward end of the spring 27 is pivoted at 28 to a bracket 29 attached to the longitudinal member 10 of the chassis. The rear ends of the springs 23 and 27 are connected to the ends of an equalizing bar 30 by means of shackles 31 and 32 respectively. The equalizing bar is pivoted to the frame between its ends as shown at 33. Such a spring suspension, as has just been briefly described, is disclosed in my copending application, Serial No. 32,357, filed May 23, 1925. It will be observed that this spring suspension provides an extremely flexible arrangement by which each axle is free to move independently with respect to the other axle, irrespective of the deflection of the individual springs that connect the several axles to the frame. It will be observed further that the axles swing in parallel arcs with respect to pivots spaced longitudinally of the frame. This construction permits the axles to follow road irregularities and to rise and fall and tilt in a substantially vertical plane in so doing.

The steering mechanism about to be described permits the free movement of the axles just referred to and at the same time such movements do not cause destructive strains and stresses to be set up in the steering mechanism that would manifest themselves in a wobbling of the wheels carried on the ends of said axles.

In accordance with the usual practice, a portion of the steering mechanism is carried by the frame, and the portions already described are carried by the wheels. The wheel carried portions include the arms 17 and 18 and the links 20 and 21. The frame carried steering mechanism of this invention comprises a steering post 34, suitably mounted in the chassis frame carrying a worm adjacent one end and a steering wheel 35 at the other end thereof. The worm meshes with the worm wheel secured to a shaft 36 suitably journalled in the chassis frame, as in brackets 37 and 38. The shaft 36 is provided with arms 39 and 40 that swing in planes that are transverse to the vehicle frame. The ends of the arms 39 and 40 are connected by universal joints, as ball joints 41 and 42 respectively, to drag links 43 and 44 that extend transversely of the frame. The links 43 and 44 are connected to brackets 45 and 46, immovably mounted upon the rods 20 and 21 before referred to, by means of ball and socket joints, permitting universal movement between the ends of the drag links 43 and 44 and the brackets 45 and 46. The ball and socket joints are indicated by the numerals 47 and 48.

It will be observed, viewing Figure 1, that the arm 39 is slightly longer than the arm 40, this arrangement causing greater angular movement of the wheels of the forwardly disposed axle 12 so that the vehicle may be steered about center 19 without introducing a substantial drag in the tires mounted upon the wheels 14 and 15 in usual manner. It will be observed that the connections between the drag links 43 and 44 and the arms 39 and 40 are made at points between the axles and their pivotal connection to the frame so that the movement of these points of connection will be less than the axle movement as the several axles move about their pivots to the frame. The steering arrangement just described does not substantially interfere with the free movement of the axles permitted by their spring suspension.

Figure 3 shows diagrammatically the effect of movement of an axle on the connection between said axle and the drag link that connects the frame carried steering mechanism with the steering mechanism carried by that axle. In this figure the frame is indicated by the numeral 10 and the axis of the pivot for the springs that connect one axle to the frame is indicated by the numeral 24. As the wheels carried by the axle 12 move over road irregularities the center of the spring moves on the arc of a circle indicated by the letter $a$ while the ends of the spring move on an arc indicated by the letter $b$. During the same movement the connection 47 moves on the arc of a circle indicated by the letter $c$ in this figure. The letters $d$, $e$, $f$, indicate three positions of the connection 47, when the axle 12 moves about its pivotal connection 24 to the frame. Similarly the letters $d'$, $e'$ and $f'$ indicate three positions of the spring centers corresponding to the positions of the connections $d$, $e$, and $f$. In said figure $d''$, $e''$ and $f''$ indicate corresponding positions of the ends of the springs in the positions of the axle corresponding to the positions $d$, $e$, and $f$ of the connection 47. It will be observed that by virtue of the fact that the connection 47 is relatively close to the pivot 24 that the amplitude of movement of said connection is less than the amplitude of movement of the center of the spring and of the end of the spring remote from its pivotal connection to the frame. It will be noted further from a consideration of this figure that the connection 47 moves in an arc that is substantially parallel to the arc of movement of the axle with which it is associated and that the difference in the path of movement of the connection 47 and the path of movement of the axle is compensated for by a slight shifting of the end of the drag link with respect to the bracket 45 to which it is attached, such slight shifting being freely permitted by the universal joint used to connect said end to said bracket.

It is accordingly clear that no substantial stresses or strains are introduced into the steering mechanism by virtue of the shifting of the axle about its spring pivot. It will be observed further that any movement of the axle causing deflection of the spring that is connected to the frame will not introduce strains in the steering mechanism because the connection 47 readily permits such movement because of the fact that it extends in a direction transverse to the length of this frame and because its ends are connected to the frame carried steering mechanism and the wheel carried steering mechanism by universal joints that permit a flexing of the drag links at said joints.

Figure 4 shows diagrammatically the effect of tilting movemtnt of the axles on the steering linkage, that is, the movement of the axle that results when the wheel at one end thereof engages a depression and the wheel at the other end of the axle simultaneously engages an elevation. This is the most severe action of this character to which the axles are subjected. Under these conditions the axles tilt and every portion thereof to one side of the center $g$ of the axle moves upward on an arc drawn from this point as a center while at the same time every point to the left of the axle moves downward a corresponding amount about the same center. Accordingly, the bracket 45, referring to the foremost axle, moves upon the arc of a circle indicated by the letter $h$ said arc being drawn from the point $g$ as a center on a radius equal to the distance from the point $g$ to the bracket 45. The connection 47 on the other hand moves on the arc of a circle indicated by the letter $i$ in this figure, said arc being drawn about the center $j$, corresponding to the point of connection between the opposite end of drag link 43 and the frame carried steering arm 39. The angle $k$ of this figure indicates the approximate range of expected movement of the axle under the assumed conditions of actual service. It will be observed that through such range the arcs $h$ and $i$ are substantially coincident so that no substantial stresses are introduced into the steering linkages by virtue of the tilting of the axle under the most severe assumed conditions. It will accordingly be observed that the arrangement just described provides a steering mechanism for a tandem axle vehicle of unusual flexibility and that the axles are capable of swinging pivotally with respect to the frame without introducing substantial stresses or strains in said mechanism, that the springs can flex without introducing such strains or stresses, and furthermore, that the axles can tilt with respect to a longitudinal center line of the vehicle without substantially effecting the steering linkages.

In the modified form of the invention, shown in Figures 5, 6 and 7, the axle 12 is secured to a pair of springs pivoted to the frame at the transversely alined points 48. The axle 13 is similarly secured to a pair of springs that are each pivoted adjacent one end to the frame at the axially alined points 49. It will be observed, viewing Figure 5, that the axles swing on arcs that are not parrallel to each other. This arrangement brings the adjacent ends of the springs on the same side of the vehicle relatively close together, and said ends are interconnected by an equalizing member 50, that is connected between its ends as at 51 to the frame 10, and that is connected by means of shackles 52 and 53 to the free ends of the springs that are associated with the axles 12 and 13 respectively adjacent each side of the frame.

The wheels 14 on axle 12 are provided with arms 17 arranged as in the form of the invention illustrated in Figures 1 and 2. Wheels 15 on the axle 13 are provided with arms 18 likewise similar to the arms above described with reference to the figures just mentioned. It will be observed that these arms are inclined with respect to a vertical plane passing centrally longitudinally through the vehicle the arrangement being such that they radiate from a center disposed approximately at the center of the rear truck, as in the preferred form of the invention above described.

Suitably supported on the frame 10 of the vehicle is a steering post 52' interconnected in any suitable manner, as by a worm and worm wheel, for example, to a steering arm 53' supported in a bracket 54 carried by said frame (Figure 7). The steering arm is disposed between a pair of drag links 55 and 56, the drag link 55 extending forwardly, while the drag link 56 extends rearwardly of the arm 53'. Said links are connected to the arm 53' by suitable ball and socket joints permitting limited universal movement between the end of said arm and each of said links. The link 55 is connected by a ball and socket or universal joint to one arm of a bell crank lever 57 pivoted to the frame 10 at 58. The other end of the drag link 56 is connected by a ball and socket or universal joint to one arm 59 of a bell crank lever that is pivoted at 60 to the frame of the vehicle. The other arm 61 of the forwardly disposed crank lever is connected to a drag link 62 by means of a suitable universal joint, the drag link 62 adjacent its other end being connected by means of a ball and socket joint, permitting limited universal movement, to a bracket 63 secured to the link 20 that connects the wheels on the axle 12 together. Similarly, the arm 64 of the rearwardly disposed bell crank lever extends forwardly and is connected at its end in any suitable manner, as by a universal joint to a drag link 65 that extends transversely of the frame and is connected at its end by means of a universal joint 66 to a bracket 67 carried by the link 21 that connects the wheels on the axle 13 together for unitary movement It will be observed that in the modification of the invention just described the connections of the drag links 62 and 65 to the brackets 63 and 67 respectively are each disposed between the axle and the pivotal mounting of the springs that connect that axle to the frame. By virtue of this arrangement it will be apparent that the amplitude of movement of the points of connection between the drag links 62 and 65 and the brackets 63 and 67 respectively, will be less than the amplitude of movement of the axle, for the reasons clearly illustrated in Figure 3.

In operation, this form of the invention permits the substantial degree of movement permitted by the spring suspension described, without introducing substantial destructive stresses in the steering mechansim, for the reasons more fully pointed out in connection with the modifications of the invention shown in Figures 1 and 2.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range or equivalency of the claims are therefore intended to be embraced therein.

What I claim and desire to secure by U. S. Letters Patent is:

1. A road vehicle comprising a frame, a pair of axles disposed adjacent the forward end of said frame, a pair of dirigible wheels on each axle, springs interconnecting said axles with said frame so that each axle is capable of substantial swinging and tilting movement relative to the frame, means to connect the wheels on the same axles together for unitary steering movement, steering mechanism supported by said frame, and means to connect said means and mechanism, consisting of a pair of drag links extending transversely of the frame of the vehicle, each drag link being connected to the frame carried steering mechanism at one end substantially in the horizontal plane of the axis of the corresponding axle and to said means adjacent its other end by flexible joints.

2. The combination defined in claim 1 in which each axle is connected to the frame by springs disposed so that several axles may swing, bodily through greater ranges of movement than those resulting solely from spring deflection, with respect to independent axes spaced longitudinally of the frame; and in which each of said drag links is horizontally disposed and connected to said means between an axle and the point of pivotal connection of said axle to the frame, whereby the amplitude of movement of said connection is reduced to a minimum.

3. A road vehicle comprising a frame, a pair of axles disposed adjacent the forward end of said frame, springs interconnecting said axles and said frame, a pair of wheels on each axle, a steering arm on each wheel, all of said steering arms being arranged so that when the vehicle is traveling in a straight path they radiate from a common point disposed substantially in the vertical plane of the longitudinal axis of said frame, and mechanism for causing said arms to be simultaneously moved.

4. A road vehicle comprising a frame, an axle at one end of said frame, a pair of wheels on said axle, springs interconnecting said axle with said frame, each of said springs being pivoted to said frame adjacent one end, a steering arm on each of said wheels, a substantially horizontal drag link between the axle and the spring pivots, said arms being arranged so that they extend toward the spring pivots for connection with said drag link, and said arms radiating toward a common point disposed at the opposite end of the vehicle on a vertical longitudinal central plane of the vehicle.

5. A road vehicle comprising a frame; a pair of substantially parallel axles disposed beneath the forward end of said frame, each of said axles being individually connected to said frame by a pair of springs, each pair of springs being pivotally attached to said frame adjacent one end at points spaced substantially longitudinally endwise of said frame, a pair of steering wheels supporting each axle, a tie rod interconnecting the wheels of each pair for simultaneous movement, a pair of drag links each connected to a tie rod adjacent one of the wheels of each pair, a pair of actuating members supported on said frame, remote from the point of connection of said drag links to said tie rods and a common control means for said actuating means supported on said frame, said actuating members being of different lengths whereby upon operation of said common control means one pair of said wheels turns more than the other pair, and each of the steering wheels being provided with an arm disposed radially with respect to a point located on the central longitudinal portion of the vehicle adjacent the rear end thereof whereby said pairs of wheels may be made to track about a common center.

6. In a multi-wheel road vehicle, a plurality of parallel axles; a frame sprung upon said axles to permit substantial relative movement therebetween, a set of dirigible wheels supporting each axle, steering means interconnecting the wheels of each set for simultaneous angular movement, and steering mechanism for operating said steering means, said mechanism comprising a substantially horizontal link, for each set of wheels, universally connected to said interconnecting means at a point to one side of and substantially in the horizontal axis plane of the corresponding axle, an actuator supported on the vehicle frame and connected to each link, and a common control device, mounted upon said frame, for operating said actuators, said actuators comprising depending oscillatable arms of different lengths, and said interconnecting means including arms, one individual to each wheel, extending from the wheels in non-parallelism toward a common point located in a vertical longitudinal plane centrally of the vehicle, whereby the several sets of wheels may be steered to turn the vehicle with a minimum amount of drag.

ARTHUR I. MARCUM.